(12) United States Patent
Sundelin et al.

(10) Patent No.: US 8,744,979 B2
(45) Date of Patent: Jun. 3, 2014

(54) ELECTRONIC COMMUNICATIONS TRIAGE USING RECIPIENT'S HISTORICAL BEHAVIORAL AND FEEDBACK

(75) Inventors: Tore Sundelin, Duvall, WA (US); James Kleewein, Kirkland, WA (US); James Edelen, Renton, WA (US); Jorge Pereira, Seattle, WA (US); Alexander Wetmore, Seattle, WA (US); John Winn, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 513 days.

(21) Appl. No.: 12/961,180

(22) Filed: Dec. 6, 2010

(65) Prior Publication Data

US 2012/0143798 A1    Jun. 7, 2012

(51) Int. Cl.
  *G06F 15/18*    (2006.01)
  *G06F 21/55*    (2013.01)

(52) U.S. Cl.
  CPC ..................................... *G06F 21/55* (2013.01)
  USPC .......................................................... 706/12

(58) Field of Classification Search
  CPC .............................. G06F 21/55; H04L 67/306
  USPC ............................................... 706/12, 20, 45
  See application file for complete search history.

(56) References Cited

U.S. PATENT DOCUMENTS

| | | | |
|---|---|---|---|
| 5,917,489 A | 6/1999 | Thurlow et al. |
| 6,424,997 B1 | 7/2002 | Buskirk, Jr. et al. |
| 6,691,106 B1 | 2/2004 | Sathyanarayan |
| 6,832,244 B1 | 12/2004 | Raghunandan |
| 7,000,194 B1 | 2/2006 | Newbold |
| 7,120,865 B1 | 10/2006 | Horvitz et al. |
| 7,155,243 B2 | 12/2006 | Baldwin et al. |
| 7,222,156 B2 | 5/2007 | Gupta et al. |
| 7,293,013 B1 | 11/2007 | Horvitz et al. |
| 7,454,716 B2 | 11/2008 | Venolia |
| 7,469,280 B2 | 12/2008 | Simpson |
| 7,483,871 B2 | 1/2009 | Herz |
| 7,519,589 B2 | 4/2009 | Charnock et al. |
| 7,653,879 B1 | 1/2010 | Sareen et al. |
| 8,065,369 B2 | 11/2011 | Turski et al. |
| 2002/0016824 A1 | 2/2002 | Leeds |

(Continued)

FOREIGN PATENT DOCUMENTS

| | | |
|---|---|---|
| WO | WO2006/038036 | 4/2006 |
| WO | 2012078342 A2 | 6/2012 |

OTHER PUBLICATIONS

Damiani, Ernesto, et al., "P2P-based collaborative spam detection and filtering." In Peer-to-Peer Computing, 2004. Proceedings. Proceedings. Fourth International Conference on, pp. 176-183. IEEE, 2004.*

(Continued)

*Primary Examiner* — David Vincent
(74) *Attorney, Agent, or Firm* — Louise Bowman; Jim Ross; Micky Minhas

(57) ABSTRACT

Triaging electronic communications in a computing system environment can mitigate issues related to large volumes of incoming electronic communications. This can include an analysis of user-specific electronic communication data and associated behaviors to predict which communications a user is likely to deem important or unimportant. Client-side application features are exposed based on the evaluation of communication importance to enable the user to process arbitrarily large volumes of incoming communications.

20 Claims, 9 Drawing Sheets

(56) References Cited

U.S. PATENT DOCUMENTS

| | | | |
|---|---|---|---|
| 2002/0038307 A1* | 3/2002 | Obradovic et al. | 707/102 |
| 2002/0041329 A1 | 4/2002 | Steinberg | |
| 2002/0199095 A1 | 12/2002 | Bandini et al. | |
| 2003/0023715 A1 | 1/2003 | Reiner et al. | |
| 2003/0120593 A1 | 6/2003 | Bansal et al. | |
| 2005/0080864 A1 | 4/2005 | Daniell | |
| 2005/0204001 A1 | 9/2005 | Stein et al. | |
| 2005/0204009 A1 | 9/2005 | Hazarika et al. | |
| 2006/0010217 A1 | 1/2006 | Sood et al. | |
| 2006/0010242 A1 | 1/2006 | Whitney et al. | |
| 2006/0031347 A1 | 2/2006 | Sahi | |
| 2006/0080393 A1 | 4/2006 | Cardone et al. | |
| 2006/0101119 A1 | 5/2006 | Qureshi et al. | |
| 2006/0195467 A1 | 8/2006 | Pearce et al. | |
| 2006/0206938 A1 | 9/2006 | Petry et al. | |
| 2006/0294191 A1 | 12/2006 | Marston et al. | |
| 2007/0118498 A1 | 5/2007 | Song et al. | |
| 2007/0124336 A1 | 5/2007 | Arellano | |
| 2007/0183655 A1* | 8/2007 | Konig et al. | 382/159 |
| 2008/0091448 A1 | 4/2008 | Niheu et al. | |
| 2008/0126951 A1 | 5/2008 | Sood et al. | |
| 2008/0249968 A1 | 10/2008 | Flinn et al. | |
| 2009/0003542 A1 | 1/2009 | Ramanathan et al. | |
| 2009/0006548 A1 | 1/2009 | Ramanathan et al. | |
| 2009/0012760 A1 | 1/2009 | Schunemann | |
| 2009/0043621 A1 | 2/2009 | Kershaw | |
| 2009/0106676 A1 | 4/2009 | Brezina et al. | |
| 2009/0150507 A1 | 6/2009 | Davis et al. | |
| 2009/0222298 A1 | 9/2009 | Atmaja | |
| 2009/0254498 A1* | 10/2009 | Gupta et al. | 706/12 |
| 2010/0057743 A1 | 3/2010 | Pierce | |
| 2010/0153318 A1* | 6/2010 | Branavan et al. | 706/12 |
| 2011/0055196 A1 | 3/2011 | Sundelin et al. | |
| 2011/0055264 A1 | 3/2011 | Sundelin et al. | |
| 2011/0224971 A1* | 9/2011 | Moore | 704/9 |

OTHER PUBLICATIONS

Office Action mailed Sep. 27, 2012, in co-pending U.S. Appl. No. 12/550,189.
U.S. Official Action dated Aug. 17, 2011 in U.S. Appl. No. 12/550,292.
"Email Mining Toolkit (EMT)"; Jun. 23, 2009; http://www1.cs.columbia.edu/~w1318/idswork/idswork.htm; 8 pages.
Addictive Tips; "Priority Inbox for Outlook 2010? Highlight Only Important Emails via Conditional Formatting" Sep. 4, 2010; http://www.addictivetips.com/microsoft-office/priority-inbox-for-outlook-2010-highlight-only-important-emails-via-conditional-formatting/; 3 pages.
Fisher, Danyel Aharon; "Social and Temporal Structures in Everyday Collaboration"; 2004; Information and Computer Science, University of California, Irvine; 214 pages.
Florea, A., et al; "An Intelligent Email Agent"; 2001; Politehnica University of Bucharest; http://citeseerx.ist.psu.edu/viewdoc/download?doi=10.1.1.36.5134&rep=rep1&type=pdf; 9 pages.
Gmail; "Priority Inbox Overview"; Sep. 14, 2010; http://mail.google.com/support/bin/answers.py?hl=en&answer=186531; 1 page.
Gloor, P., et al.; "Visualization of Communication Patterns in Collaborative Innovation Networks, Analysis of some W3C working groups"; May 28, 2003; MIT Center for Coordination Science, Dartmouth Tuck Center for Digital Strategies, Dartmouth College, Dept. of Computer Science; 7 pages.
Greif, I., et al.; "Communication Trends and the On-Demand Organization"; May 2003; A Lotus Workplace White Paper, CUE Collaborative User Experience, IBM T.J. Watson Research Center; 18 pages.
IBM; "Triage and Capture: Rethinking Mobile Email" Jan. 5, 2010; http://www.almaden.ibm.com/cs/projects/mobileemail/; 5 pages.
Lifehacker.com; "Email Prioritizer Adds 'Pause' Button, Auto-Ranking to Email"; Aug. 20, 2008; http://lifehacker.com/400639/email-prioritizer-adds-pause-button-auto+rankinig-to-email; 2 pages.
Lim, Mark Jyn-Huey; "Computational Intelligence in E-mail Traffic Analysis"; May 2008; University of Tasmania; 257 pages.
McCulloh, I., et al.; "Unobtrusive Social Network Data From Email"; Dec. 2008; Network Science Center, United States Military Academy; 6 pages.
Salvatore, J., et al.; "Behavior-based Modeling and its Application to Email Analysis"; 2006; Columbia University; 41 pages.
SNS UK; "Open Text Email Management 10 Redefines Email Classification to Combat Content Overload"; Oct. 23, 2009; http://www.sns-uk.co.uk/news_full.php?id=1796&title=Open-Text-Email-Management-10- Redefines-Email-Classification-to-Combat-Content-Overload-; 2 pages.
U.S. Appl. No. 12/550,189, filed Aug. 28, 2009, entitled "Data Mining Electronic Communications".
U.S. Appl. No. 12/550,292, filed Aug. 28, 2009, entitled "Data Mining Organization Communications".
Tang et al.; "Email Data Cleaning"; ACM; copyright 2005; 10 pages.
U.S. Office Action in U.S. Appl. No. 12/550,189 mailed Jun. 7, 2012; 24 pages.
Final Office Action in U.S. Appl. No. 12/550,292 mailed Mar. 7, 2012, 16 pages.
International Search Report and Written Opinion in PCT/US2011/061571 dated Jun. 1, 2012, 9 pages.
U.S. Official Action mailed Nov. 19, 2013 in U.S. Appl. No. 12/550,292, 41 pages.

* cited by examiner

ELECTRONIC COMMUNICATIONS TRIAGE USING RECIPIENT'S HISTORICAL BEHAVIORAL AND FEEDBACK

BACKGROUND

The increasing use of electronic devices to manage personal and professional communications typically translates into an increase in incoming messages. In many instances, the sheer volume of incoming messages often precludes the ability of an end user to effectively process it all. Examples of issues and inefficiencies stemming from such message overload include an increased potential for oversight of an important messages, and increasing time investment required to sift through received messages.

SUMMARY

In one aspect, a method for triaging electronic communications in a computing system environment includes: training a default model at a computing device to personalize a recipient-specific model for a recipient, wherein the default model is formed from a plurality of weighted factors adjusted against a sample of users having common characteristics with the recipient, and the recipient-specific model is formed from the default model that is modified using the recipient's historical behavioral and feedback information; intercepting an item addressed to the recipient at the computing device; extracting a plurality of item features associated with the item at the computing device; retrieving the recipient-specific model, wherein the recipient-specific model comprises the plurality of weighted factors associated to the plurality of extracted item features; applying an importance classification model to the plurality of extracted item features including forming a combination of the plurality of weighted factors; generating a predicted item importance based on the combination of the plurality of weighted factors; and enabling at least one application feature associated with the item for the recipient based on the predicted item importance.

In another aspect, a computing device includes: a processing unit; a system memory connected to the processing unit, the system memory including instructions that, when executed by the processing unit, cause the processing unit to implement a training module configured for hierarchical training of a user model for triaging electronic communications in a computing system environment, the training module is configured to: generate a set of default inferences for a user based on the prototypical user model, wherein a default inference comprises an item attribute, an attribute value, an attribute weight, and an attribute confidence; acquire user-specific information to personalize the set of default inferences to the user including: retrieval of user-specific historical behavioral and feedback information, and retrieval of user-specific behavioral and feedback information in response to receipt of an item; update the set of default inferences with the user-specific information to form a personalized set of inferences for application to an item triage model; and enable at least one application feature associated with the user for exposing a predicted item importance.

In yet another aspect, a computer readable storage medium has computer-executable instructions that, when executed by a computing device, cause the computing device to perform steps including: training a default model at a computing device to personalize a recipient-specific model for a recipient, wherein the default model is formed from a plurality of weighted factors adjusted against a sample of users having common characteristics with the recipient, the common characteristics selected from a group including: common vocation, and common interest, and the recipient-specific model is formed from the default model that is modified using the recipient's historical behavioral and feedback information; intercepting an item addressed to the recipient at the computing device, wherein the item selected from a group including: an e-mail message, a calendar message, an instant message, a web-based message, and a social collaboration message; extracting a plurality of item features associated with the item at the computing device, wherein the item features include a characteristic of the item selected from a group including: an item sender characteristic, an item recipient characteristic, a conversation characteristic, and an attachment characteristic; retrieving the recipient-specific model, wherein the recipient-specific model comprises the plurality of weighted factors associated to the plurality of extracted item features; applying an importance classification model to the plurality of extracted item features including forming a combination of the plurality of weighted factors; generating a predicted item importance based on the combination of the plurality of weighted factors, wherein the predicted item importance designating the item as one of: important, and unimportant; enabling at least one application feature associated with the item for the recipient based on the predicted item importance selected from a group including: an emphasizing feature for highlighting key content of the item; and display feature for providing a quick view of the item; and a notification feature for providing temporary view of the item; and periodically acquiring recipient behavior and feedback associated with the item for a predetermined time period for continuing training of the default model to personalize the recipient-specific model.

This Summary is provided to introduce a selection of concepts, in a simplified form, that are further described below in the Detailed Description. This Summary is not intended to identify key or essential features of the claimed subject matter, nor is it intended to be used in any way to limit the scope of the claimed subject matter.

DESCRIPTION OF THE DRAWINGS

Aspects of the present disclosure may be more completely understood in consideration of the following detailed description of various embodiments in connection with the accompanying drawings.

DETAILED DESCRIPTION

The present disclosure is directed to systems and methods for triaging electronic communications in a computing system environment. Triage techniques described herein mitigate issues related to large volumes of incoming electronic communications by enabling an analysis of user-specific electronic communication data and associated behaviors to determine which communications a respective user is likely to deem important or unimportant. Evaluation of communication importance is used to expose application features that enable an end user to effectively process arbitrarily large volumes of incoming communications. Although not so limited, an appreciation of the various aspects of the present disclosure will be gained through a discussion of the examples provided below.

Figure 1:
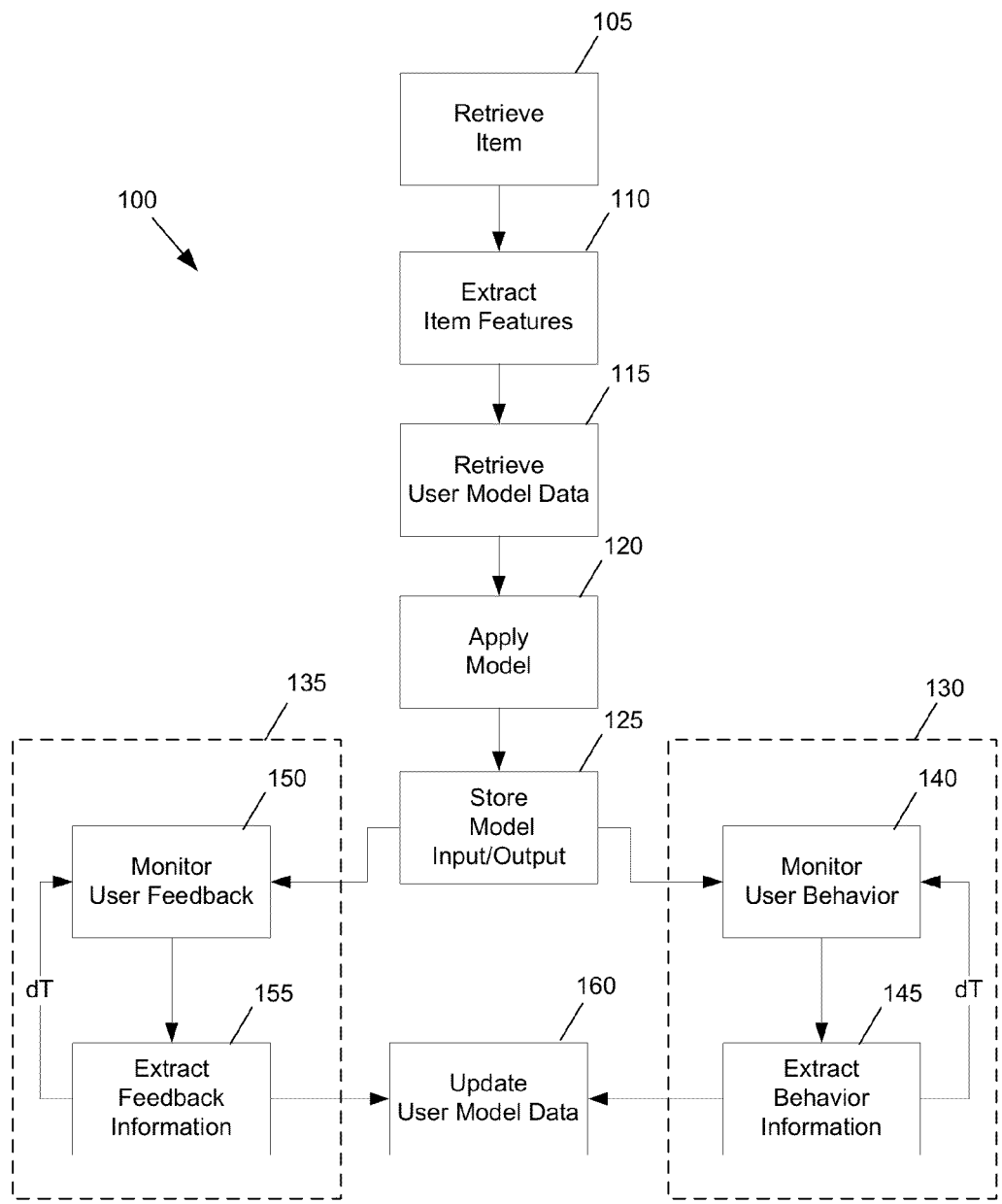
FIG. 1 is a flowchart of an example method for training user model data for triaging electronic communications.

Referring now to FIG. 1, an example method 100 for training user model data for triaging electronic communications is shown. In general, the method 100 may be implemented by a server-side process or a client-side process. Examples of a server-side process and client-side process are described below in connection with FIGS. 2-9. Other embodiments are possible. For example, the method 100 may be implemented in a hybrid manner incorporating functionality of both a server-side process and client-side process.

The method 100 begins at a collection module 105. The collection module 105 is configured to retrieve electronic communication data intended for a recipient, such as an individual or group of individuals, from a process that manages the communication data. Electronic communication data is generally referred to as an item. An example item includes an e-mail message, a voicemail message, a calendar appointment, an SMS message, an IM message, an MMS message, a web update, a Facebook message, a twitter feed, an RSS feed, an electronic document, and others. Other embodiments are possible.

Operational flow proceeds to a parse module 110. The parse module 110 is configured to extract a plurality of item features of the item as retrieved by the collection module 105. An item feature is generally any conceivable characteristic of an item that can be directly extracted or inferred based on an understanding of content of the item.

For example, an item feature may include a characteristic related to a sender and/or recipient of the item such as, for example, sender/recipient identification (e.g., SMTP address), sender/recipient relationship (e.g., supervisor), sender/recipient domain or company (e.g., Microsoft) sender/recipient type (e.g., AutoMail), sender/recipient location (e.g., emergency room), sender/recipient device (e.g., smartphone), item send characteristics (e.g., CC), and others. Other example item features include a characteristic related to recipient and/or contextual characteristics such as, for example, sender/recipient current or future status (e.g., in meeting), sender/recipient current or future location (e.g., Minneapolis), and others.

Other example item features include a characteristic related to an item type (e.g., e-mail message), attachment presence (e.g., Yes), access control information (e.g., DRM), priority information (e.g., High), temporal information (e.g., date/time received), and others. Other example item features include a characteristic related to a conversation start characteristics (e.g., started by me?), conversation contribution characteristics (e.g., contributions from me?), item hierarchical characteristics (e.g., latest in conversation?), and others. Other example item features include a characteristic related to subject line prefix (e.g., RE), subject line keywords (e.g., Read), and others. Other example item features include a characteristic related to item body or item attachments such as, for example, text keywords (e.g., Important), hyperlink content (e.g., Yes—contains hyperlink), and others.

Still other item features are possible.

Operational flow then proceeds to an acquire module 115. The acquire module 115 is configured to retrieve model data specific to each intended recipient of the item as retrieved by the collection module 105. In the following example discussion, the intended recipient includes a single individual, and the recipient-specific model data is retrieved by the acquire module 115 from a data storage device. An example data storage device is described below in connection with FIG. 2.

In example embodiments, the recipient-specific model data includes a plurality of item features (e.g., corresponding to item features extracted by the parse module 110), each of which are assigned a weight that embodies an indication of whether the recipient tends to associate importance or unimportance with a respective item feature. For example, if the recipient tends to read e-mail messages sent from a supervisor and tends to ignore e-mail messages sent from an automated service, an item feature within the model data for the recipient associated with the supervisor might include a weighting factor greater that an item feature associated with the automated service. In general, a weight or weighting factor can include any form of quantitative measure such as a numerical value, a threshold, and others. For example, the item feature associated with the supervisor as discussed above might include a weight of "7," whereas the item feature associated with the automated service might include a weight of "3."

Operational flow then proceeds to an implementation module 120. The implementation module 120 is configured to apply model criteria of a classification model to the recipient-specific model data retrieved by the acquire module 115. As described in further detail below with respect to FIG. 6, recipient-specific model data can be formed via a hierarchical training process using prototypical model data calculated from analyzing training data from a number of related users to more accurately and efficiently train a model for a single user (i.e., the recipient). Other embodiments are possible.

The implementation module 120 is further configured to generate one or more predictions based on type of the classification model. Example model criteria includes a designation of item features of the recipient-specific model data that are relevant to the classification model, and further an algorithm designating use of weights associated with those item features evaluated as relevant.

In example embodiments, the classification model corresponds to an "importance" model, where the implementation module 120 correlates relevant item features from the recipient-specific model data to associated weights, and uses a combination of those weights to generate a predicted item importance. The predicted item importance generally includes a prediction of whether the item as retrieved by the collection module 105 might be important or unimportant to the intended recipient. Other embodiments are possible. For example, in some embodiments, the classification model corresponds to an "urgency" model, where the implementation module 120 correlates relevant item features from the recipient-specific model data to associated weights, and uses a combination of those weights to generate a predicted item urgency indicating those items the intended recipient should consider or direct attention to as soon as possible. Still other embodiments are possible.

An example application of an importance model includes calculating an overall importance weight of a new e-mail message, and then determining whether or not the e-mail message is important to the recipient based on the calculated importance weight. For example, on a scale of "1 to 10," a calculated importance weight of "4" may designate the e-mail message as moderately important, a calculated importance weight of "7.8" may designate the e-mail message as extremely important, and a calculated importance weight of "−6" may designate the e-mail message as unimportant. Other embodiments are possible. For example, in some embodiments, overall importance weight of a new e-mail message is calculated as a probability ranging from "0" to "1" designating relative importance of the e-mail message. For example, thresholds ranging from "0" to "0.2" may designate relative importance of the e-mail message as "unimportant" or "cold", thresholds ranging from "0.2" to "0.8" may designate relative importance of the e-mail message as "normal", and thresholds ranging from "0.8" to "1" may designate relative importance of the e-mail message as "important" or "hot". Still other embodiments are possible.

Operational flow then proceeds to a store module 125. The store module 125 is generally configured to store the recipient-specific model data retrieved by the acquire module 115, and the one or more predictions generated by the implementation module 120.

Operational flow then branches between a first training branch 130 and a second training branch 135. The example first training branch 130 includes a first monitor module 140 and a first extraction module 145. The second training branch 135 includes a second monitor module 150 and a second extraction module 155. In general, operational flow within the first training branch 130 is independent with respect to the second training branch 135.

Referring now to the first training branch 130, the first monitor module 140 is configured to monitor and acquire recipient behavior with respect to the item as retrieved by the collection module 105. Example recipient behavior includes any form of directly observable action related to the item. Such observable actions may be a singular action or a compound action. In the example of an e-mail message, recipient behavior may be associated with singular actions such as opening the e-mail message, deleting the e-mail message, and forwarding the e-mail message. Compound actions may include actions such as briefly scanning the e-mail message and then promptly deleting it, neglecting to access an e-mail message automatically filed to a folder via transport rule, and others.

The first monitor module 140 is configured to monitor and acquire recipient behavior with respect to the item as retrieved by the collection module 105 for a predetermined time period dT. An example time period includes a fraction of an hour, an hour, a day, a week, etc. Following expiration of the predetermined time dT, the first monitor module 140 forwards acquired recipient behavior to the first extraction module 145. In other embodiments, the first monitor module 140 is additionally configured to monitor and acquire recipient behavior with respect to the item as retrieved by the collection module 105 based on a recipient action designating relative importance or following passage of a predetermined time period, whichever occurs first. Examples of recipient action designating relative importance includes "replied to" designating importance, "briefly skimmed and quickly deleted" designating unimportance, and others. Acquisition of recipient behavior based on combination of recipient action and passage of a predetermined time period enables quick and efficient updating of the classification model, as described in further detail below.

The first extraction module 145 is configured to mine acquired recipient behavior and generate behavior verification data. In general, behavior verification data contains information with respect to whether the predicted item importance generated by the implementation module 120 is consistent with whether the recipient actually deems the item important or unimportant. The first extraction module 145 subsequently forwards the behavior verification data to an update module 160. The update module 160 is configured to adjust weights associated with the plurality of item features of the recipient-specific model data. For example, in the example of an e-mail message, if the behavior verification data contains information that strongly suggests that the recipient considers e-mail messages sent from a supervisor important, an item feature associated with the supervisor as discussed above might be adjusted or readjusted from a weight of "7" to a weight of "9." Other embodiments are possible.

In example embodiments, operational flow returns to the first monitor module 140 from the first extraction module 145 following a predetermined time delay dT. Looped process flow within the first training branch 130 serves to continuously fine tune recipient-specific model data based on recipient actions.

Referring now to the second training branch 135, the second monitor module 150 is configured to monitor and acquire recipient feedback related to importance of the item as retrieved by the collection module 105. Example recipient feedback includes any form of explicit feedback from the recipient related to importance of the item. In the example of an e-mail message, explicit feedback may include recipient correction of predicted item importance generated by the implementation module 120, such as marking the e-mail message as unimportant when the implementation module 120 has incorrectly flagged the e-mail message as important. Other embodiments are possible.

For example, other explicit feedback includes enabling or disabling certain processing rules or calibration of processing rules relative to importance such as disabling use of a sender's company as an indicator of item importance. Other explicit feedback includes setting thresholds for levels of importance, such as defining items as important only when a relative importance is greater than a threshold weight. Other explicit feedback includes customization of existing processing rules or definition of new processing rules, such as flagging an e-mail message sent from a spouse containing a string '911" as urgently important. Still other embodiments are possible.

The second monitor module 150 is configured to monitor and acquire recipient feedback with respect to the item as retrieved by the collection module 105 for a predetermined time period dT (e.g., an hour, a day, a second, etc). Following expiration of the predetermined time dT, the second monitor module 150 forwards acquired recipient feedback to the second extraction module 155. Other embodiments are possible.

The second extraction module 155 is configured to mine acquired recipient feedback and generate feedback verification data. In some embodiments, feedback verification data contains explicit designation as to whether the predicted item importance generated by the implementation module 120 is consistent with whether the recipient actually deems the item important or unimportant. The second extraction module 155 subsequently forwards the feedback verification data to the update module 160. In the example instance, the update module 160 is configured to adjust weights associated with the plurality of item features of the recipient-specific model data based on recipient feedback. For example, in the example of an e-mail message, if feedback verification data contains designation that the recipient strongly considers e-mail messages sent from an automated service unimportant, an the item feature associated with the automated service as discussed above might be adjusted from a weight of "5" to a weight of "1." Other embodiments are possible.

Operational flow returns back to the second monitor module 150 from the second extraction module 155 following a predetermined time delay, dT. The looped process flow within the second training branch 135 serves to continuously fine tune the recipient-specific model data based on recipient feedback.

In some embodiments, the recipient-specific model data is updated differently based on information received via the first training branch 130 and the second training branch 135. For example, confidence associated with information received by the second training branch 135 can be assigned a greater confidence than information received by the first training branch 130. In this manner, information received by the second training branch 135 (i.e., explicit feedback) will have a greater impact on training the recipient-specific model data than information received by the first training branch 130 (i.e., implicit feedback). For example, in some embodiments, information received by the second training branch 135 completely overrides information received by the first training branch 130. Other embodiments are possible.

Additionally, information received by the first training branch 130 may be assigned varying strength in terms of confidence related to importance to determine which information has greater impact on training the recipient-specific model data. For example, an observed recipient action such as "reply" may be assigned a greater strength than "read at length," which may be assigned a greater strength than "ignored," which may be assigned a greater strength than "read quickly," and etc. Other embodiments are possible.

As described in further detail below with respect to FIG. 2-9, the example method 100 enables a wide variety of client-side application features such that an end user can effectively triage arbitrarily large volumes of incoming communications. An example client-side application feature includes a highlighting or emphasizing feature for highlighting or emphasizing key content within an item. Such a highlighting feature is low impact by virtue of clearly marking certain items or inserting content into a communication to help a user rapidly triage communications but not substantially altering functionality of the client-side application.

Another example client-side application feature includes a quick view feature that allows a user to quickly view only most important communications. Another example client-side application feature includes an auto-prioritize feature that provides a sorted view according to most important communications. Another example client-side application feature includes an age-out feature that automatically files, marks as read, or deletes communications that have not been addressed after a certain period. Another example client-side application feature includes a notification feature that is configured to selectively provide new communication and/or content notifications based on communications deemed important. In some embodiments, the notification feature is user context sensitive. Another example client-side application feature includes a synopsis feature that provide synopsis of communication content to help user quickly decide actions to pursue with respect to the communication. Another example client-side application feature includes a dashboard feature that provides a consolidated view of important communications across different data sources such an e-mail data source, a document data source, a web-based data source, and a social networking data source.

Still other client-side application features are possible as well.

Figure 2:
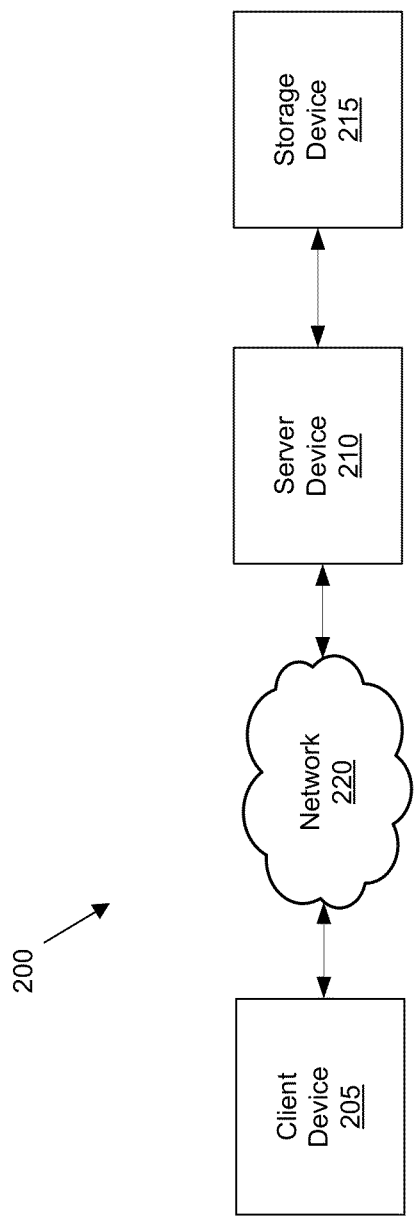
FIG. 2 shows an example networked computing environment.

Referring now to FIG. 2, an example networked computing environment 200 is shown in which aspects of the present disclosure may be implemented. The networked computing environment 200 includes a client device 205, a server device 210, a storage device 215, and a network 220. Other embodiments are possible. For example, the networked computing environment 200 may generally include more or fewer devices, networks, and other components as desired.

The client device 205 and the server device 210 are general purpose computing devices, such as described below in connection with FIG. 3. In example embodiments, the server device 210 is a business server that implements business processes. Example business processes include messaging process, collaboration processes, data management processes, and others. Exchange Server from Microsoft Corporation is an example of a business server that implements messaging and collaborative business processes in support of electronic mail, calendaring, and contacts and tasks features, in support of mobile and web-based access to information, and in support of data storage. SHAREPOINT® collaboration server, also from Microsoft Corporation, is an example of a business server that implements business processes in support of collaboration, file sharing and web publishing. Other business servers that implement business processes are possible.

In some embodiments, the server device 210 includes of a plurality of interconnected server devices operating together in a "Farm" configuration to implement business processes Still other embodiments are possible.

The storage device 215 is a data storage device such as a relational database or any other type of persistent data storage device. The storage device 215 stores data in a predefined format such that the server device 210 can query, modify, and manage data stored thereon. Examples of such a data storage device include mailbox stores and address services such as ACTIVE DIRECTORY® directory service from Microsoft Corporation. Other embodiments of the storage device 215 are possible.

The network 220 is a bi-directional data communication path for data transfer between one or more devices. In the example shown, the network 220 establishes a communication path for data transfer between the client device 205 and the server device 210. In general, the network 220 can be of any of a number of wireless or hardwired WAN, LAN, Internet, or other packet-based communication networks such that data can be transferred among the elements of the networked computing environment 200. Other embodiments of the network 220 are possible as well.

Figure 3:
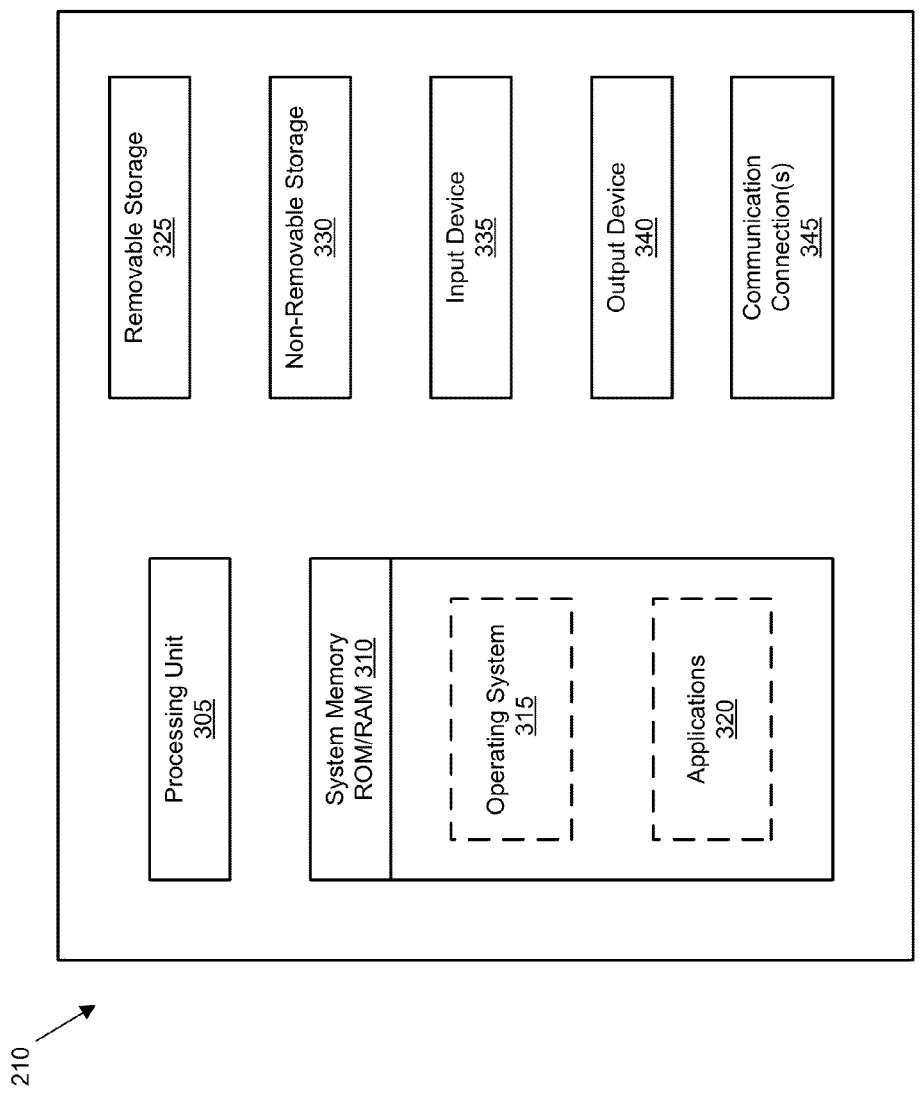
FIG. 3 shows an example server computing device of the environment of FIG. 2.

Referring now to FIG. 3, the server device 210 of FIG. 2 is shown in further detail. As mentioned above, the server device 210 is a general purpose computing device. Example general purpose computing devices include a desktop computer, laptop computer, personal data assistant, smartphone, server, netbook, notebook, cellular phone, tablet, television, video game console, and others.

The server device 210 includes at least one processing unit 305 and a system memory 310. The system memory 310 can store an operating system 315 for controlling the operation of the server device 210 or another computing device. One example operating system 315 is the WINDOWS® operating system from Microsoft Corporation, or a server, such as Exchange Server, SHAREPOINT® collaboration server, and others.

The system memory 310 may also include one or more software applications 320 and may include program data. Software applications 320 may include many different types of single and multiple-functionality programs, such as an electronic mail program, a calendaring program, an Internet browsing program, a spreadsheet program, a program to track and report information, a word processing program, and many others. One example multi-functionality program is the Office suite of applications from Microsoft Corporation.

The system memory 310 can include physical computer readable storage media such as, for example, magnetic disks, optical disks, or tape. Such additional storage is illustrated in FIG. 3 by removable storage 325 and non-removable storage 330. Computer readable storage media can include physical volatile and nonvolatile, removable and non-removable media implemented in any method or technology for storage of information, such as computer readable instructions, data structures, program modules, or other data. Computer readable storage media can also include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by server device 210. Any such computer storage media may be part of or external to the server device 210.

Communication media is distinguished from computer readable storage media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media.

The server device 210 can also have any number and type of an input device 335 and output device 340. An example input device 335 includes a keyboard, mouse, pen, voice input device, touch input device, and others. An example output device 340 includes a display, speakers, printer, and others. The server device 210 can also contain a communication connection 345 configured to enable communications with other computing devices over a network (e.g., network 220 of FIG. 2) in a distributed computing system environment.

Figure 4:
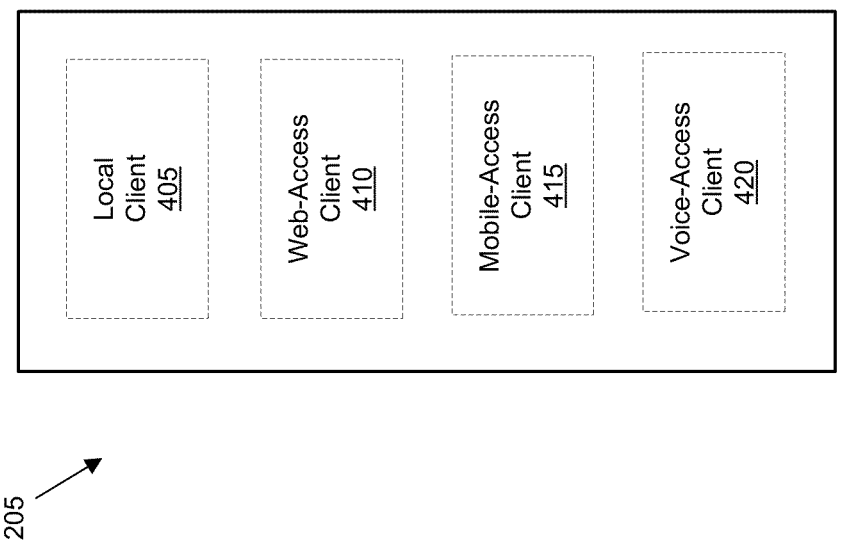
FIG. 4 shows example logical modules of a client device of the environment of FIG. 2.

In example embodiments, the client device 205 of FIG. 2 is configured similar to the server device 210 described above. Referring now additionally to FIG. 4, the client device 205 of FIG. 2 is also configured to include one or more different types of client interfaces to the server device 210. In the example shown, the client device 205 includes a local client 405, a web-access client 410, a mobile-access client 415, and a voice-access client 420. Other types of client interfaces to the server device 210 are possible as well.

The local client 405 is configured as a dedicated messaging and collaboration client that serves as an interface to the server device 210 and is part of a suite of applications executing on the client device 205. In one embodiment, the local client 405 includes the OUTLOOK® messaging client, which is an e-mail application that is part of the Microsoft Office suite of applications. A user can compose, interact with, send and receive e-mails with the OUTLOOK® messaging client. Other embodiments of the local client 405 are possible.

The web-access client 410 is configured to accesses the server device 210 remotely using a network connection, such as the Internet. In one embodiment, the web-access client 410 is the Outlook Web Access webmail service of Exchange Server. In the example embodiment, the client device 205 uses a web browser to connect to Exchange Server via Outlook Web Access. This brings up a user interface similar to the interface in the OUTLOOK® messaging client in which a user can compose, interact with, send and receive e-mails.

Other embodiments of the web-access client 410 are possible. For example, the web-access client 410 may be configured to connect to the SHAREPOINT® collaboration server to access corresponding collaboration, file sharing and web publishing services. Still other embodiments of the web-access client 410 are possible.

The mobile-access client 415 is another type of client interface to the server device 210. In one embodiment, the mobile-access client 415 includes the Mobile Access with ACTIVE-SYNC® synchronization software or the Windows Mobile Device Center for Vista or Windows 7, all from Microsoft Corporation. A user can synchronize messages between a mobile device and Exchange Server using a mobile access client like Mobile Access with ACTIVESYNC® synchronization software. Example mobile devices include a cellular telephone, smartphone, a personal digital assistant, and others. Other embodiments of the mobile-access client 415 are possible.

The voice-access client 420 is yet another type of client interface to the server device 210. In some embodiments, the voice-access client 420 includes Exchange Unified Messaging that is supported in Exchange Server. With Exchange Unified Messaging, users have one inbox for e-mail and voicemail. Voicemails are delivered directly into the OUTLOOK® messaging client inbox. The message containing the voicemails may also include an attachment. Other embodiments of the voice-access client 420 are possible.

Figure 5:
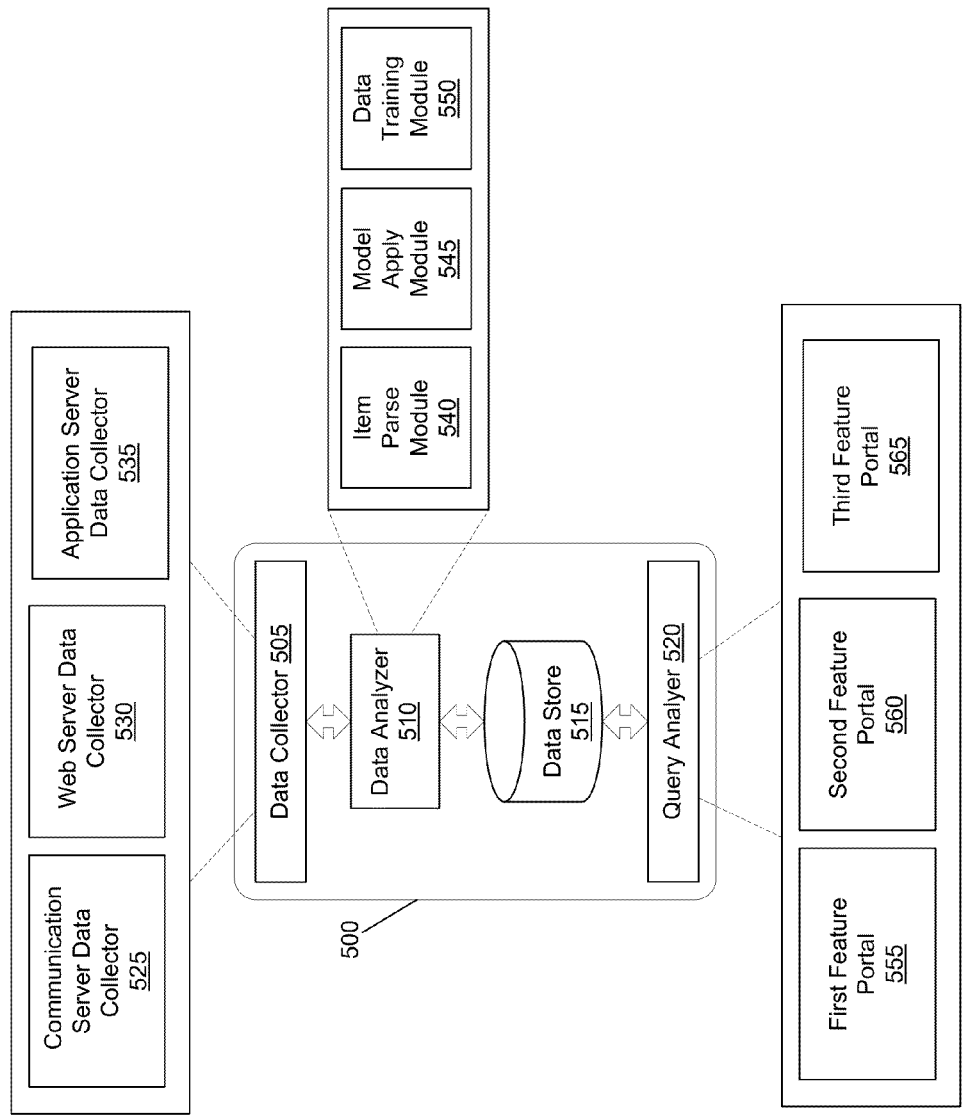
FIG. 5 shows an example triage application environment.

Referring now to FIG. 5, an example operating environment 500 configured to implement systems and methods for triaging electronic communications in a computing system environment is shown. The operating environment 500 may be implemented by a server side process executing on server computing device or a client side process executing on a client computing device such as described above in connection with FIGS. 1-4. Other embodiments are possible. For example, the operating environment 500 may be implemented in a hybrid manner incorporating functionality of both a server side process and client side process. Such flexibility in implementation of the example systems and methods for triaging electronic communications is beneficial in many aspects such as, for example, enabling optimum resource allocation, load balancing, and others.

The example operating environment 500 includes a data collector 505, a data analyzer 510, a data store 515, and a query analyzer 520.

The data collector 505 is configured collect and aggregate raw item data from a variety of electronic communication and related sources, such as e-mail data, voicemail data, calendar data, SMS data, IM data, MMS data, web page update data, social network data, electronic document data, and others. As electronic communication and related sources typically package and transmit data in different formats, the data collector 505 may include multiple, logical data collector modules that support these differences, such as a communication server data collector 525, a web server data collector 530, and an application server data collector 535. Other types of logical data collector modules are possible.

The data analyzer 510 includes an item parse module 540, a model apply module 545, and a data training module 550. The item parse module 540 is configured to extract a plurality of item features of respective item data as retrieved by the data collector 505. As discussed above within context of the example method 100, an item feature is generally any characteristic of communication data that can be directly extracted or inferred based on an understanding of content of respective communication data.

The model apply module 545 is configured to retrieve recipient-specific model data of an intended recipient corresponding to respective item data as retrieved by the data collector 505. The model apply module 545 is additionally configured to apply model criteria of a classification model to the recipient-specific model data and generate one or more item specific predictions based on type of the classification model. In one embodiment, the classification model is an importance-based model. Other embodiments are possible.

The data training module 550 is configured to monitor and acquire recipient behavior and explicit recipient feedback associated with an intended recipient corresponding respective item data as retrieved by the data collector 505. The data training module 550 is additionally configured to adjust the recipient-specific model data as retrieved by the model apply module 545 based on acquired recipient behavior and explicit recipient feedback.

As mentioned above, the operating environment 500 also includes a query analyzer 520. In general, the query analyzer 520 is configured to process client-side application feature requests such that an end user can effectively triage arbitrarily large volumes of incoming communications. In the example embodiment, the query analyzer 520 includes a first feature portal 555, a second feature portal 560, and a third feature portal 565.

The first feature portal 555 is configured to support feature requests corresponding to a highlighting or emphasizing feature for exposing key content within a client-side application, such as described in further detail below in connection with FIG. 7 and FIG. 8. The second feature portal 560 is configured to support feature requests corresponding to a quick view feature for providing a quick view of items within a client-side application deemed most important, also described below in connection with FIG. 7 and FIG. 8. The third feature portal 565 is configured to support feature requests corresponding to a notification feature for providing selective notification within a client-side application based on items deemed important, as described in further detail below in connection with FIG. 9. Other embodiments of the query analyzer 520 are possible.

In example embodiments, data collected by the data collector 505 and/or processed by data analyzer 510 may be stored in data store 515. Additionally, the data store 515 supports and stores searches and results processed by query analyzer 520.

Figure 6:
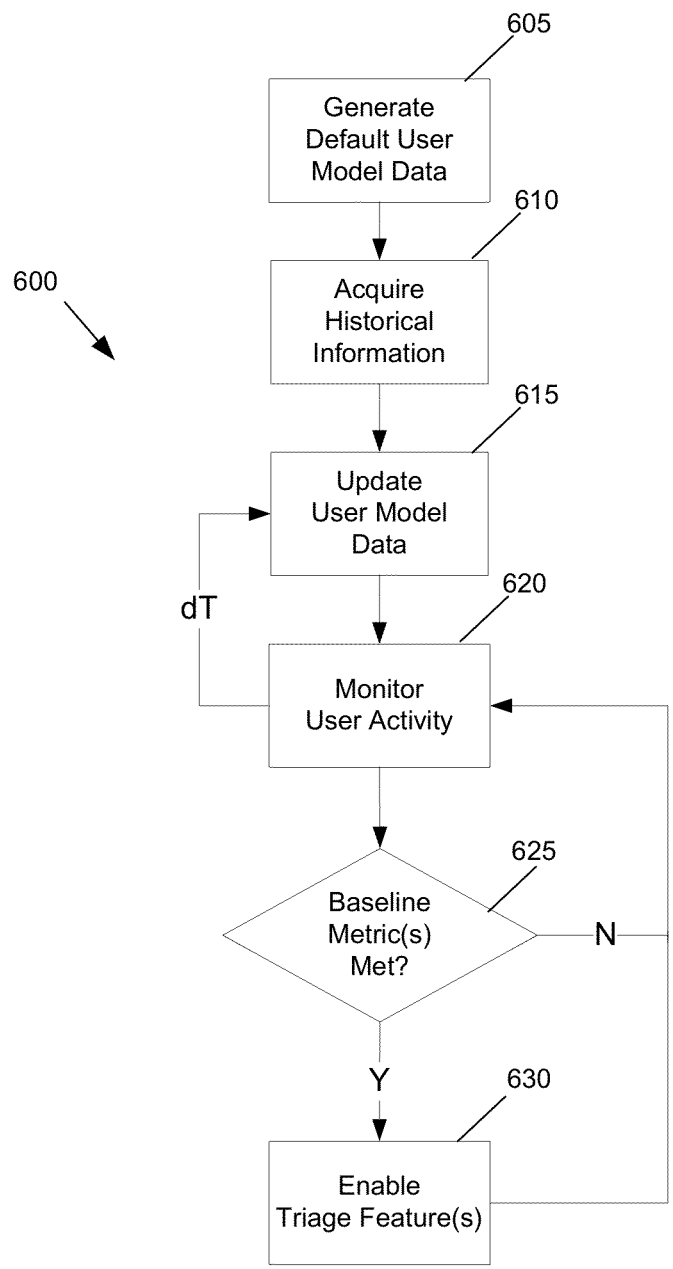
FIG. 6 is a flowchart of an example method for hierarchical training of user model data for triaging electronic communications.

Referring now to FIG. 6, an example method 600 for hierarchical training of user model data for triaging electronic communications is shown. In general, the method 600 may be implemented by a server-side process or a client-side process. Examples of a server-side process and client-side process are described above in connection with FIGS. 1-5. Other embodiments are possible. For example, the method 600 may be implemented in a hybrid manner incorporating functionality of both a server-side process and client-side process.

The method 600 is configured for providing optimal understanding of user-specific behaviors and preferences, referred to as user model data. User model data is based on a set of user-specific inferences. Example inferences in accordance with the present disclosure correspond to relative importance and unimportance of a particular item attribute based on observer user behavior and explicit user feedback. In one embodiment, an inference comprises an item attribute, an attribute value, an attribute weight, and an attribute confidence. An example set of user-specific inferences that may be obtained based on user-specific communication data, behavior, and feedback include:

| Item Attribute | Attribute Value | Attribute Weight (0-10) | Confidence Rating (0-100%) |
| --- | --- | --- | --- |
| Sender Relationship | Manager | 8.7 | 78% |
| Contains Follow Up | Asks me question | 7.2 | 68% |
| Item Topic | Fishing | 3.2 | 23% |

An item attribute of an inference is a characteristic of a particular piece of communication. Example item attributes include sender relationship, contains follow-up, and item topic. Other embodiments are possible. For example, other attributes include item sender, item topic, item sent time, item type, and others. The importance of a particular attribute value (e.g., "sender relationship"="manager") is evaluated by observing user behavior as it relates to the particular attribute value. Example user behavior may include observing whether a user tends to exhibit behavior denoting importance (e.g., spending a significant period of time with an item open) for items sent by a manager. In the example shown, attribute weight is represented by a scaled numerical value. Other embodiments are possible.

The confidence rating of an inference corresponds to a confidence associated with a particular importance rating for a given item attribute value. In the example shown, confidence rating of the inference "sender relationship"="manager" is relatively high (i.e., 78%). Confidence rating of the inference "item topic"="fishing" is relatively low (i.e., 23%). In some embodiments, a high confidence rating of an inference may be achieved when several instances of attribute value is observed associated with consistent behavior. A low confidence rating of an inference may be achieved when few instances of attribute value are observed, instances of an attribute value are not recent, and/or the user behavior was inconsistent. Other embodiments are possible.

In some embodiments, certain inferences may be co-dependent or be composed of multiple, related item attributes. An example of a co-dependent inference includes a scenario in which a user receives many e-mail messages from a colleague "Alex." Some of the example e-mail messages are sent to a large distribution list ("DL"), of which the user is included, and others sent directly to the user. In one scenario, when "Alex" sends an e-mail message to the user via the distribution list, the user tends to treat those items as unimportant. However, when "Alex" sends an e-mail message to the user directly, the user tends to treat those items as unimportant. There are two related co-dependent inferences that represent the example scenario. A first inference includes attributes "sender"="Alex" and "recipient"="DL" and may exhibit a relatively low attribute weight (e.g., "4") and a high confidence rating (e.g., 80%). A second inference includes "sender"="Alex" and "recipient"="recipient" and may exhibit a relatively high attribute weight (e.g., "8") and a high confidence rating (e.g., 80%). In general, any arbitrary co-dependent inference may be comprised of any number of arbitrary composite attributes.

In example embodiments, compiling and calculating a set of weights for a particular user is referred to as training. The example method 600 is configured for training user model data in multiple stages. Specifically, operation 605 corresponds to a first stage "bootstrapping" operation that generates a set of generalized default weights for a new user based on a prototypical user model. The set of default weights represents default user model data. An example prototypical user model includes an importance model developed, prototyped, and tested against a large population of sample users having common characteristics, such as common vocation, common interests, and others.

Following first stage "bootstrapping" at operation 605, user-specific information is obtained to update and tune the set of default weights to personalize the default user model for a specific user. For example, operational flow proceeds to an operation 610 that corresponds to a second stage "crawling" operation that evaluates available historically logged behavioral data, feedback data, and communication data. Example historically logged behavioral data includes e-mail message "compose" behaviors such as sending, responding, or forwarding messages. Other historically logged behavioral data and communication items are possible and may be system implementation specific.

Following second stage "crawling" at operation 605, operational flow proceeds to an operation 615 that corresponds to updating the set of generalized default weights of the default user model data to form a personalized set of weights. The personalized set of weights corresponding to user-specific model data.

Following formation of user-specific model data at operation 615, operational flow proceeds to a third stage "on-line" operation 620 corresponding to real-time monitoring and acquiring user-specific behaviors and feedback with respect to items, similar to functionality of the example first training branch 130 described above in connection with FIG. 1. The operation 620 being implemented to update and tune the personalized set of weights as formed at operation 615.

In example embodiments, operational flow returns back to operation 615 following a predetermined time delay, dT. Looped process flow between operation 615 and operation 620 being implemented to continuously fine tune the personalized set of weights of the user-specific model data. Such looped process flow is advantageous in many aspects. For example, certain weights may change or become obsolete over time, such as when user changes jobs or a supervisor changes. In the example embodiment, information as obtained at operation 620 and corresponding updates to operation 615 will capture respective changes and adapt the personalized set of weights over time.

In example embodiments, process flow proceeds to an evaluation operation 625 following iteration between operation 615 and operation 620. The evaluation operation 625 corresponds to a determination of whether the personalized set of weights of the user-specific model data are sufficient to expose functionality based on the associated classifications, such as triage features related to labeling new items as important.

When the evaluation operation 625 determines that the personalized set of weights of the user-specific model data are insufficient to expose functionality based on the associated classifications, operation flow branches back to operation 620 for further tuning and adjustment of the personalized set of weights.

When the evaluation operation 625 determines that the personalized set of weights of the user-specific model data are sufficient to expose functionality based on the associated classifications, operation flow branches to an operation 630 corresponding to completion of initial training of the personalized set of weights. In the example embodiment, triage features related to associated classifications are enabled at operation 630 and are accessible via client-side application feature requests such that an end user can effectively triage arbitrarily large volumes of incoming communications (i.e., first feature portal 555, second feature portal 560, third feature portal 565) In general, completion of initial training of the personalized set of weights at operation 630 may be obtained without any active or direct input from the user.

Figure 7:
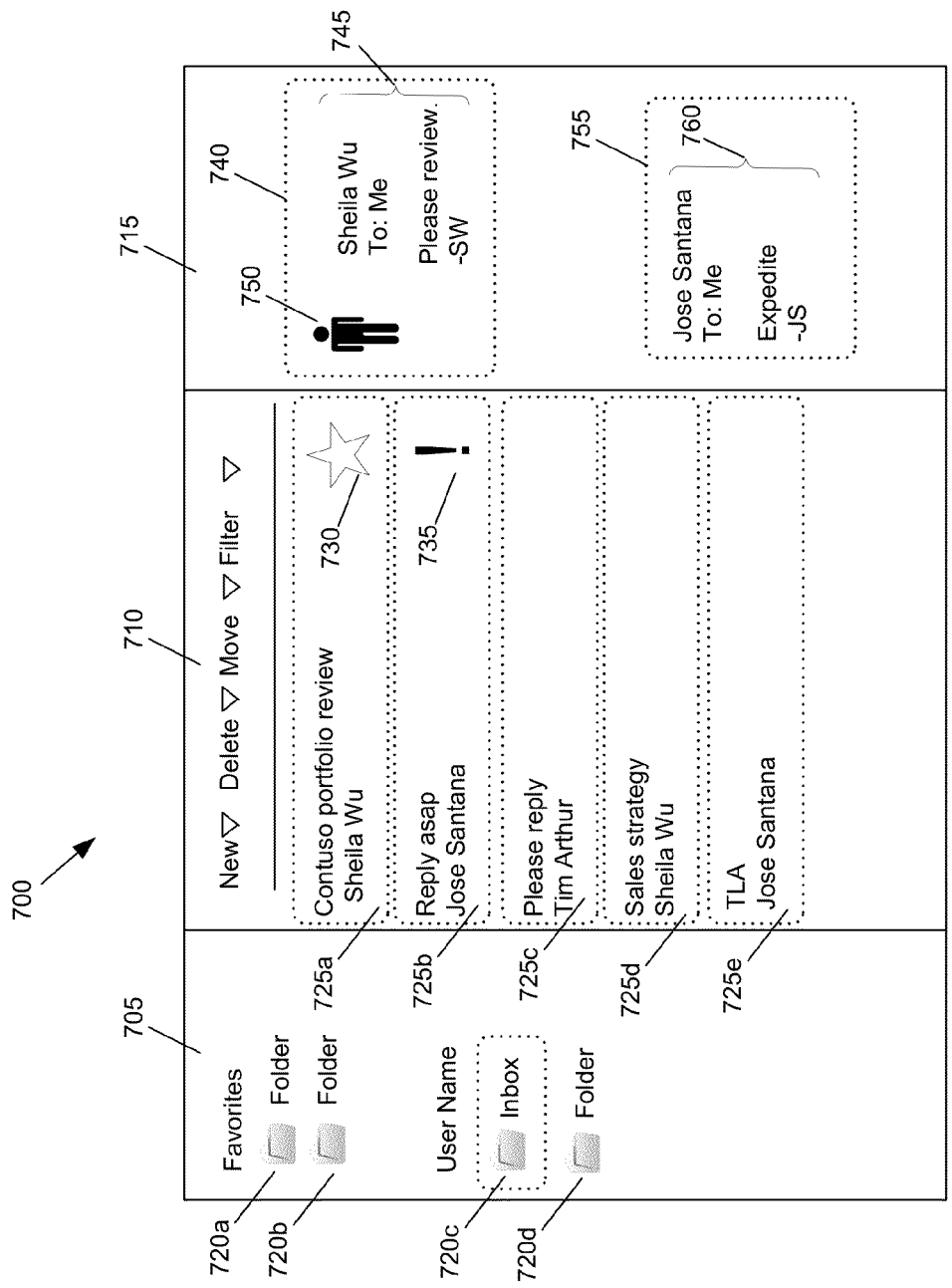
FIG. 7 shows a first view of an example triage message environment.

Referring now to FIG. 7, a first example message environment 700 is shown in accordance with the present disclosure. In general, the message environment 700 is an e-mail messaging application associated with a communication application, such as the OUTLOOK® messaging client. Other embodiments are possible.

In example embodiments, the message environment 700 includes a folder pane 705, a list pane 710, and a display pane 715. The example folder pane 705 includes a list of folders 720a-d used to store data such as e-mail messages. In the example shown, the folder 720c is selected for display in the list pane 710 as a list of e-mail messages 725a-e.

In the example shown, the e-mail message 725a is highlighted by a first importance mark 730 and the e-mail message 725b is highlighted by a second importance mark 735. In general, the first importance mark 730 designates the e-mail message 725a important by virtue of being sent from "Sheila Wu." Additionally, the e-mail message 725a may be displayed in the display pane 715 as a first quick view 740 by virtue of being important. In the example embodiment, the first quick view 740 is configured to display content 745 of the e-mail message 725a and an image 750 of "Sheila Wu." The geometry and tone of the first importance mark 730 is configurable and may designate presence of key content within the e-mail message 725a, such as the subject line term "review." Other embodiments are possible.

The second importance mark 735 may designate the e-mail message 725b important by virtue of being sent from "Jose Santana." The e-mail message 725b may be displayed in the display pane 715 as a second quick view 755 by virtue of being important. In the example embodiment, the second quick view 755 is configured to display content 760 of the e-mail message 725b. The geometry and tone of the second importance mark 735 is configurable may designate presence of key content of the e-mail message 725a, such as the body text "Expedite."

In general, the first importance mark 730 and the second importance mark 735 permit a user to quickly identify respective e-mail message 725a and e-mail message 725b as important. Geometry and tone of first importance mark 730 and the second importance mark 735 may be selected as desired and may designate certain characteristics of the respective e-mail message 725a and e-mail message 725b, and further influence placement and prominence of the first quick view 740 and second quick view 755 within the display pane 715 as desired. Other embodiments are possible.

Figure 8:
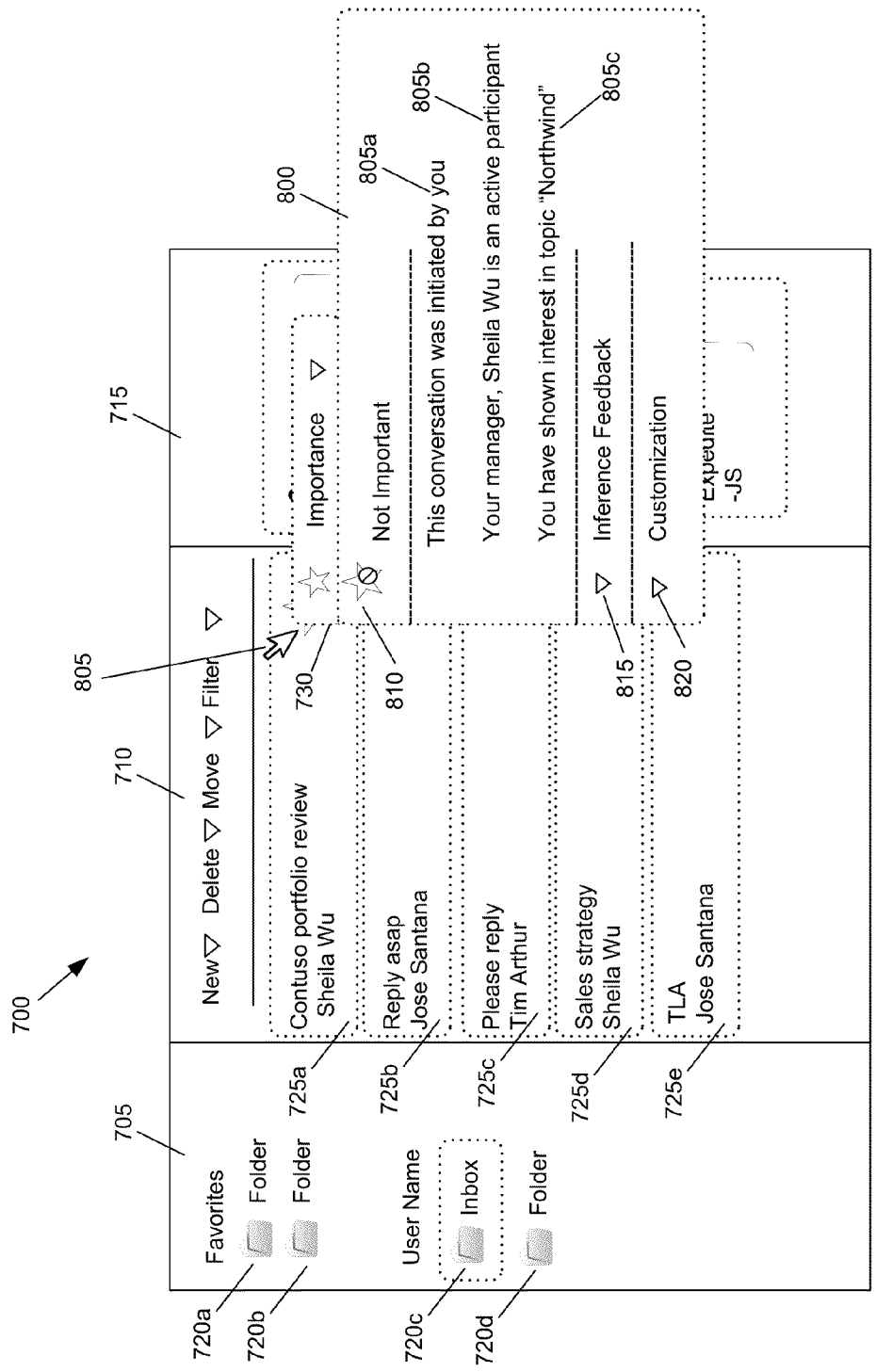
FIG. 8 shows a second view of the message environment of FIG. 7.
Figure 9:
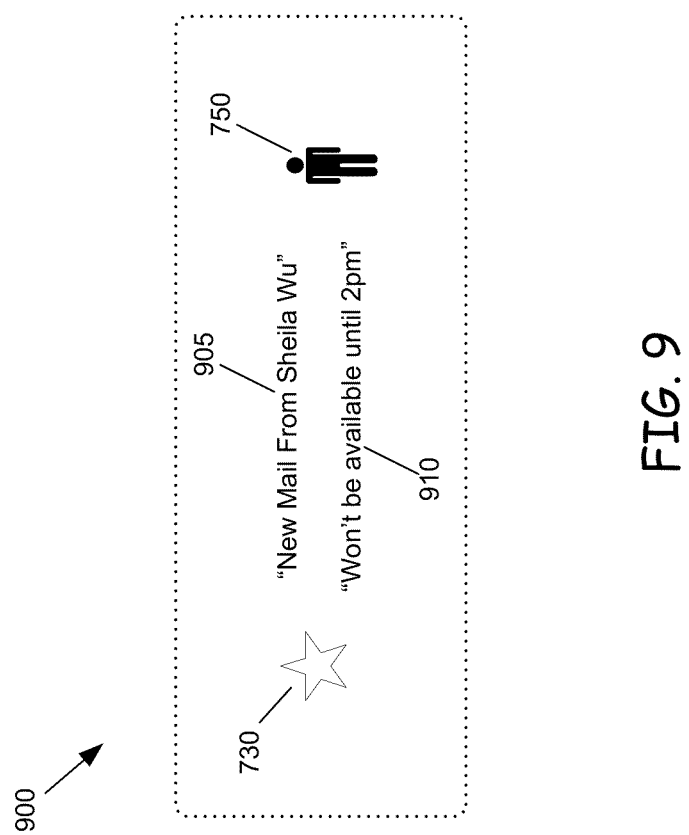
FIG. 9 shows a first view of another example triage message environment.

Referring now to FIG. 8, the message environment 700 of FIG. 7 is shown including a user module 800. In the example embodiment, a cursor 805 is used to select the first importance mark 730 to expose to the user module 800.

In general, the user module 800 is configured to provide a high level of transparency to a user to enable feedback and customization. For example, the user module 800 can expose a set of user inferences 805a-c in a context sensitive and intuitive manner. The example user inferences convey and understanding as to how classification of a certain item (i.e., e-mail message 725a) is determined as important or unimportant. The user module 800 additionally is configured to expose a manual adjustment button 810 that permits the user to change importance of an item from important to unimportant if desired. In example embodiments, such active feedback to update item classification of that item as well as associated user model data and can further take the active feedback that into account when classifying new items or reclassifying existing items.

The user module 800 additionally is configured to expose an inference feedback button 815 that enables a user to provide feedback designating an inference as incorrect or that an inference that is generally correct has been misapplied to a particular email message. Such active feedback serves to update item classification of that item as well as associated user model data. Such active feedback can additionally be received when classifying new items or reclassifying existing items. The inference feedback button 815 is further configured to permit a user to define new inferences or define special "meta-inferences" or a calculated co-dependent inference based on multiple attributes and values. Other embodiments are possible. The user module 800 additionally is configured to expose a customization button 820 for user customization. Example user customization includes threshold customization such as to define a minimum importance and/or confidence rating an item must have to be marked as important within the message environment 700. Other example user customization includes stratification such as definition of how many levels of importance to define and expose in the message environment 700 (e.g., low, medium, hi). Other example user customization includes visual indicator definition such as how to denote relative importance in the message environment 700 (e.g., via icons, previews). Other example user customization includes toolbar definition such as permitting the user to define buttons or commands to expose related to the features/applications. Such customization can be device or application specific. Other example user customization includes granularity of feedback definition such that the user can decide what level of active feedback controls to expose via the message environment 700. Still other embodiments are possible Referring now to FIG. 9, a second example message environment 900 is shown in accordance with the present disclosure. In general, the message environment 900 is a notification application such as the "Smart Toast" pop-up messaging application produced by Microsoft Corporation. Other embodiments are possible.

In example embodiments, the message environment 900 is exposed to a user upon receipt of a new e-mail message evaluated as important. For example, similar to the respective e-mail message 725a described above in connection with FIG. 7 and FIG. 8, upon receipt of an e-mail message from "Sheila Wu," the message environment 900 may be displayed for a predetermined period of time including the first importance mark 730 and image 750 of "Sheila Wu." The message environment 900 further includes identification metadata 905 such as "New Mail From Sheila Wu" and contextual metadata 910 such as "Won't be available until 2 pm." In example embodiments, the message environment 900 notifies a user of only those messages (i.e., e-mail message 725a) evaluated as "important" and quickly shows why those messages were evaluated as important. Other embodiments of the message environment 900 are possible as well.

The example embodiments described herein can be implemented as logical operations in a computing device in a networked computing system environment. The logical operations can be implemented as: (i) a sequence of computer implemented instructions, steps, or program modules running on a computing device; and (ii) interconnected logic or hardware modules running within a computing device.

For example, the logical operations can be implemented as algorithms in software, firmware, analog/digital circuitry, and/or any combination thereof, without deviating from the scope of the present disclosure. The software, firmware, or similar sequence of computer instructions can be encoded and stored upon a computer readable storage medium and can also be encoded within a carrier-wave signal for transmission between computing devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for triaging electronic communications in a computing system environment, the method comprising:
    training a default model at a computing device to personalize a recipient-specific model for a recipient, wherein the default model is formed from a plurality of weighted factors adjusted against a sample of users having common characteristics with the recipient, and the recipient-specific model is formed from the default model that is modified using the recipient's historical behavioral and feedback information;
    intercepting an item addressed to the recipient at the computing device;
    extracting a plurality of item features associated with the item at the computing device;
    retrieving the recipient-specific model, wherein the recipient-specific model comprises the plurality of weighted factors associated to the plurality of extracted item features;
    applying an importance classification model to the plurality of extracted item features, including forming a combination of the plurality of weighted factors, by calculating an importance weight as a probability range of threshold values;
    generating a predicted item importance based on the combination of the plurality of weighted factors; and
    enabling at least one application feature associated with the item for the recipient based on the predicted item importance.

2. The method of claim 1, wherein the common characteristics comprise one or more of a common vocation and common interest.

3. The method of claim 1, further comprising adjusting the plurality of weighted factors based on the recipient's historical behavioral and feedback information.

4. The method of claim 1, further comprising continuing training of the default model to personalize the recipient-specific model by acquiring recipient behavior associated with the item.

5. The method of claim 1, further comprising continuing training of the default model to personalize the recipient-specific model by acquiring recipient feedback associated with the item.

6. The method of claim 1, further comprising continuing training of the default model to personalize the recipient-specific model by acquiring recipient customization, the recipient customization comprising one or more of an inference correction, processing rule definition, threshold definition and importance granularity.

7. The method of claim 1, further comprising continuing training of the default model to personalize the recipient-specific model by periodically acquiring recipient behavior associated with the item.

8. The method of claim 1, further comprising the predicted item importance designating relative importance of the item.

9. The method of claim 8, further comprising periodically acquiring recipient behavior associated with the item for a predetermined time period to evaluate correctness of the predicted item importance.

10. The method of claim 9, further comprising adjusting at least one of: the plurality of weighted factors; and the predicted item importance based on the acquired recipient behavior.

11. The method of claim 8, further comprising periodically acquiring recipient feedback associated with the item for a predetermined time period to evaluate correctness of the predicted item importance.

12. The method of claim 11, further comprising adjusting at least one of: the plurality of weighted factors; and the predicted item importance based on the recipient feedback.

13. The method of claim 1, wherein the item includes a communication comprising one or more of an e-mail message, a voicemail message, a calendar message, an instant message, a web-based message and a social collaboration message.

14. The method of claim 1, wherein the extracted item features includes at least one of a directly observed item characteristic and an inferred item characteristic.

15. The method of claim 1, further comprising enabling the application feature selected from a group including: an emphasizing feature for highlighting key content of the item; a display feature for providing a quick view of the item; a notification feature for providing temporary view of the item and including information related to derived importance of the item; an auto-prioritize feature for providing an importance sorted view of the item and other items; an age-out feature for providing an action to the item after a time period; a synopsis feature for providing synopsis of content of the item; and a dashboard feature for providing a consolidated view of important communications across different data sources.

16. A computing device, comprising:
a processing unit;
a system memory connected to the processing unit, the system memory including instructions that, when executed by the processing unit, cause the processing unit to implement a training module configured for hierarchical training of a user model for triaging electronic communications in a computing system environment, the training module being configured to:
generate a set of default inferences for a user based on the prototypical user model, wherein a default inference comprises an item attribute, an attribute value, an attribute weight, and an attribute confidence;
acquire user-specific information to personalize the set of default inferences to the user including: retrieval of user-specific historical behavioral and feedback information, and retrieval of user-specific behavioral and feedback information in response to receipt of an item;
update the set of default inferences with the user-specific information to form a personalized set of inferences for application to an item triage model; and
enable at least one application feature associated with the user for exposing a predicted item importance, the predicted item importance being generated from an importance classification model utilized to calculate an importance weight as a probability range of threshold values based on a combination of a plurality of weighted factors.

17. The computing device of claim 16, wherein an item comprises an electronic communication, and wherein the item attribute comprises a characteristic of a particular element of the communication, the attribute value comprises a specific instance of the item attribute, the attribute weight comprises a scaled value denoting importance of the attribute value, and the attribute confidence comprises a value designating confidence associated with the attribute weight.

18. The computing device of claim 16, wherein the prototypical model comprises a plurality of weighted factors adjusted against a sample of users having characteristics common with the user, the common characteristics comprising one or more of a common vocation and common interest.

19. The computing device of claim 16, wherein retrieval of the user-specific behavioral and feedback information in response to receipt of an item comprises periodic data acquisition to continuously adjust the personalized set of inferences.

20. A physical computer readable storage medium storing computer-executable instructions that, when executed by a computing device, cause the computing device to perform steps comprising:
training a default model at a computing device to personalize a recipient-specific model for a recipient, wherein the default model is formed from a plurality of weighted factors adjusted against a sample of users having common characteristics with the recipient, the common characteristics selected from a group including: common vocation, and common interest, and the recipient-specific model is formed from the default model that is modified using the recipient's historical behavioral and feedback information;
intercepting an item addressed to the recipient at the computing device, wherein the item selected from a group including: an e-mail message, a calendar message, an instant message, a web-based message, and a social collaboration message;
extracting a plurality of item features associated with the item at the computing device, wherein the item features include a characteristic of the item selected from a group including: an item sender characteristic, an item recipient characteristic, a conversation characteristic, and an attachment characteristic;
retrieving the recipient-specific model, wherein the recipient-specific model comprises the plurality of weighted factors associated to the plurality of extracted item features;
applying an importance classification model to the plurality of extracted item features, including forming a combination of the plurality of weighted factors, by calculating an importance weight as a probability range of threshold values;
generating a predicted item importance based on the combination of the plurality of weighted factors, wherein the predicted item importance designating the item as one of: important, and unimportant;
enabling at least one application feature associated with the item for the recipient based on the predicted item importance selected from a group including: an emphasizing feature for highlighting key content of the item; and display feature for providing a quick view of the item; and a notification feature for providing temporary view of the item; and
periodically acquiring recipient behavior and feedback associated with the item for a predetermined time period for continuing training of the default model to personalize the recipient-specific model.

* * * * *